United States Patent [19]
Keil et al.

[11] Patent Number: 4,588,413
[45] Date of Patent: May 13, 1986

[54] PROCESS FOR PRODUCING DYEINGS WITH REACTIVE DYESTUFFS

[75] Inventors: Karl-Heinz Keil, Hanau-Mittelbuchen; Fritz Engelhardt, Frankfurt; Ulrich Greiner, Schöneck; Klaus Sternberger, Bad Vilbel; Manfred Pelster, Speyer, all of Fed. Rep. of Germany

[73] Assignee: Cassella Aktiengesellschaft, Frankfurt, Fed. Rep. of Germany

[21] Appl. No.: 632,243

[22] Filed: Jul. 19, 1984

[30] Foreign Application Priority Data

Aug. 11, 1983 [DE] Fed. Rep. of Germany ....... 3329029

[51] Int. Cl.$^4$ .............................................. C09B 62/00
[52] U.S. Cl. ........................................... 8/543; 8/551; 8/604; 8/918
[58] Field of Search .................................. 8/543, 551

[56] References Cited

U.S. PATENT DOCUMENTS 3,301,696  1/1967  Taube et al. ............................ 8/496
3,334,138  8/1967  Feeman .................................... 8/551

FOREIGN PATENT DOCUMENTS 2843645  4/1980  Fed. Rep. of Germany .
50-53675  5/1975  Japan .
53-44589  11/1978  Japan .

Primary Examiner—A. Lionel Clingman
Attorney, Agent, or Firm—Connolly and Hutz

[57] ABSTRACT

Improvements in the fastness properties of substrates dyed with reactive dyestuffs are achieved by a dyeing after-treatment with an agent which is the reaction product polyethyleneimine and a bifunctional alkylating agent.

10 Claims, No Drawings

PROCESS FOR PRODUCING DYEINGS WITH REACTIVE DYESTUFFS

The present invention relates to a method for dyeing textile materials consisting of or containing cellulosic fibres with reactive dyestuffs to a high wet-fastness level in a relatively simple and inexpensive way.

Textile materials, for example woven or knitted fabrics or even yarns or threads, consisting of of containing cellulosic fibres can be dyed with reactive dyestuffs in conventional manner by treating the textile material with a dyeing liquor containing a reactive dyestuff in the manner of an exhaust process, usually at elevated temperatures and, with most commercially available reactive dyestuff types, in the presence of alkali, or two-step processes, for example the pad-steam process or the cold pad-batch process, may be employed. In the pad-steam process, as in the cold pad-batch process, the textile material is first of all padded with a reactive dyestuff liquor in which the alkali may already be present, or the alkali may be applied in a separate impregnating step. In the pad-steam process, the dyestuff is then fixed by steaming, while in the cold pad-batch process the dyestuff is fixed by batching the impregnated cloth and leaving it at room temperature for several hours. Other ways of fixing the dyestuff have been disclosed and are used in industrial practice, such as, for example, treating the cloth—after it has been padded with an alkalifree reactive dyestuff liquor—with a hot sodium silicate solution.

In all these reactive dyeing processes a covalent chemical bond between dyestuff molecule and cellulose molecule is formed in the course of the dyeing. This type of dyestuff is thus anchored on the fibre by chemical means.

In theory reactive dyeings on cellulose should thus automatically have very high wet-fastness properties. In practice, however, it is found that this is not the case. There are various reasons for this discrepancy, and some may still be unknown. It is certain, however, that more or less of the reactive dyestuff present at the start of the dyeing reacts not with the cellulose fibre but with water molecules. The reaction with water destroys the ability of the reactive dyestuff to bond chemically with the cellulose and it is held on the fibre molecule only by secondary valency forces.

These phenomena in the practical production of dyeings have the effect, in the final analysis, that dyeings of reactive dyestuffs on cellulose fibres have high wet-fastness properties only if they are subjected to a thorough wash after the dyeing. This required after-treatment can be almost as technically complicated as the actual dyeing. In particular, the wash after the dyeing requires large amounts of water, and to obtain the desired high wet-fastness of the dyeings it is frequently necessary to do more than one wash, in fact to do a number of washes in succession. The fact that the washes are involved, technically very complicated and very expensive was the impetus for a number of indepth studies of the washing-off properties of residual dyestuffs. An example of such a study is the paper published by Dipl.-Chem. F. Somm and Text.-Ing. (grad.) R. Buser in Textil-Praxis International 1982 (July) "Einfluss verschiedener Parameter auf das Auswaschverhalten von Reaktivfarbstoffen" (The Effect of Various Parameters on the Washing-Off Properties of Reactive Dyestuffs).

Nor has there been a shortage of attempts or proposals for facilitating the washing-off of dyestuff residues and/or to increase the wet-fastness of dyeings without having to increase the energy expended on washing off.

German Offenlegungsschrift No. 2,910,583 discloses a soap-off auxiliary for dyeings and prints on textile materials which is based on the use of an alkali metal aluminosilicate with or without polyvinylpyrrolidone.

The problem of removing from the cellulose fibre portions of hydrolysed reactive dyestuff which are inherently water-soluble but which are held on the fibre as a result of their substantivity due to secondary valency forces and hence of improving the wet-fastness properties of the goods has also already been tackled in German Offenlegungsschrift No. 2,747,358 (corresp. to GB Pat. No. 2,006,279) and German Offenlegungsschrift No. 2,843,645. German Offenlegungsschrift No. 2,747,358 advises using polyamines, polyamides or polyurethanes, and polyureas for this purpose. According to German Offenlegungsschrift No. 2,843,645, alkoxylated polyamines, for example alkoxylated polyethyleneimine, can be used for the same purpose.

To solve a related problem, namely that of improving the wet-fastness properties of substantive dyeings, it is known from German Auslegeschrift No. 1,111,144, German Auslegeschrift No. 1,131,649 (corresp. to GB Pat. No. 890,463), Belgian Pat. No. 625,711 (corresp. to U.S. Pat. No. 3,301,696) and U.S. Pat. No. 3,334,138 to subject the dyeings to an aftertreatment with basic polyguanidine compounds and polymeric quaternary nitrogen-containing compounds.

Another possible state of the art way of improving the wet-fastness properties of substantive dyeings involves an aftertreatment with condensation products of cyanamide, formaldehyde and salts of organic amines or ammonium salts.

Japanese Patent Application No. 53-675 relates to the aftertreatment of vat dyeings for the purpose of improving the fastness properties. The technical problem is in this case, however, vastly different from that of aftertreating reactive dyeings.

After all, vat and sulphur dyestuffs, unlike reactive dyestuffs, are inherently water-insoluble and, before the textile materials are entered into the dyeing liquors, are first of all converted into a water-soluble form by means of reducing agents. The dissolved dyestuffs, owing to a certain substantivity, are adsorbed onto the cellulose fibres, that is to say, according to current theory, ideally they penetrate into the cellulose micelle and are highly concentrated there. The actual dyeing process is followed by an oxidising step in which the water-soluble, so-called leuco dyestuffs are oxidised back to water-insoluble macromolecules. This prevents the dyestuff molecules which have penetrated into the cellulose micelle from escaping again.

In the case of sulphur and vat dyestuffs it is likely that the dyestuff becomes genuinely anchored to the fibre only if the dyestuff molecules have penetrated into the cellulose micelle. Dyestuff portions deposited at or near the surface of the cellulose fibre are evidently only held there relatively loosely.

In the course of oxidising the vat dyeing, then, even dyestuff portions which have not penetrated into the fibre micelle but have been adsorbed on the surface are converted into completely water-insoluble, pigmentlike oxidation products. However, these water-insoluble dyestuff portions on the fibre surface, spoiling the appearance of the dyed goods, are largely valencysaturated particles which are held only relatively loosely on the fibre surface. The forces between this pigmentous dust and the fibre surface on the one hand and the forces between hydrolysed reactive dyestuff residues and the fibre surface on the other hand cannot be compared with one another. Now, Japanese Patent Application No. 53-675 recommends aftertreating vat dyeings with epichlorohydrin-modified diethylenetriamine/adipic acid copolymers or epichlorohydrinmodified polyethyleneimine. According to Japanese Pat. No. 53-44,589 (corresp. to U.S. Pat. No. 4,345,078), this aftertreatment with epichlorohydrinmodified polyethyleneimine can also be combined with a sizing process.

However, the aftertreatment agents so far disclosed for aftertreating reactive dyeings or substantive dyeings still leave something to be desired in practice. For instance, they are relatively ineffective, so for significant effects their levels have to be high. The resulting effects are inadequate, in particular as regards wash-fastness at 60° C. and especially at 95° C. and also as regards wet-rub fastness properties. The perspiration fastness obtainable on aftertreating reactive dyeings with the known condensation products of cyanamide, formaldehyde and amines still leaves a lot to be desired. Moreover, traces of formaldehyde are frequently found on the treated goods. In addition, the aftertreatment with the state of the art basic compounds presents processing problems, since it has to be carried out very carefully so as not to reprecipitate dyestuff dissolved off the fibre or adhesively to bond adsorbed dyestuff portions to the fibre surface. Thus, if the existing aftertreatment agents are not handled with care it is easy to produce the opposite of the desired effect. It is a further defect of aftertreatment agents so far disclosed that at above pH 9 amines such as methylamine or dimethylamine and cause considerable odour nuisance in the course of the application process. Polyethyleneimine gives rise to similar problems.

In principle it is of course possible to produce reactive dyeings with high wet-fastness properties simply by washing the dyed material at elevated temperatures in a sufficient number, for example 6 to 8, of successive washes with effective detergents under vigorous mechanical agitation. However, this process is not only very time-consuming and requires a great deal of expense on apparatus but also consumes an amount of water so enormous as to be incompatible with the objective of making sensible use of water, in particular water fit for drinking. Moreover, spent wash liquors are produced in very large amounts and need of course to be treated before they can be discharged into sewers or rivers. It was therefore as ever an urgent problem to simplify the wash, to save raw materials and costs, and to facilitate ecologically satisfactory disposal of the dyehouse waste water by providing a process with which it is possible to arrive with less effort at reactive dyeings which have the required fastness properties, in particular wet fastness properties, such as water fastness, wash fastness at 60° and in particular 95° C., acid and alkaline perspiration fastness, fastness to seawater and rub fastness.

It has now been found, surprisingly, that, in producing reactive dyeings, it is possible to save a large portion of the otherwise required washing steps and nevertheless to arrive at dyeings of excellent fastness properties if the dyeings are subjected to an aftertreatment in a wash liquor which, in addition to customary detergents and wash liquor additives, contains an aftertreatment agent which contains a reaction product of polyethyleneimine with bifunctional alkylating agents.

The aftertreatment according to the invention is normally carried out at a liquor ratio of 5:1 to 3:1, preferably 10:1 to 20:1, in a liquor which contains per liter 0.5 to 6 g, preferably 1 to 3 g, of the auxiliary according to the invention. In special cases it is of course possible to vary the liquor ratio and the concentration of auxiliary beyond the indicated normal limits. The desired improvement in fastness properties is basically obtained when the auxiliary is applied at a level of 0.5 to 5%, preferably 1 to 3%, in particular 2 to 3%, on weight of fibre.

The aftertreatment with the aftertreatment liquor to be used according to the invention is advantageously carried out at 40° to 100° C., preferably 60° to 90° C.

The polyethyleneimine required for preparing the aftertreatment agent to be used according to the invention has the formula I

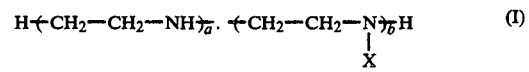

where X is a radical of the formula $-(CH_2-CH_2-NH)_c-H$, a and b, independently of each other, are numbers from 0 to 600 such that their sum, i.e. a+b, is a number from 50–600, and c is a number from 0 to 50.

So the polyethyleneimine used is a molecule in which there are $-NH_2-$, $>NH-$ and, possibly, $-N<$ units which are linked to one another by ethylene groups. In total the polyethyleneimine contains about 50 to 600 ethyleneimine units. In customary commercial products the primary, secondary and tertiary nitrogen functions are in a ratio of about 1:2:1 by number.

In principle, any known bifunctional alkylating agent can be used for the reaction with the ethyleneimine of the formula I. Such known bifunctional alkylating agents have the formula II $$A-Z-A \qquad (II)$$

where A denotes the radical of an alkylating agent and Z denotes either a direct bond or a divalent bridge member.

In bifunctional alkylating agents of the formula II which are particularly suitable for reacting with the polyethyleneimines to give auxiliaries to be used according to the invention, A denotes a group of the formula $-CH_2-Y$, where Y is a substituent which can be eliminated in the form of an anion, in particular chlorine, bromine, iodine or $-OH$, or a group which can be eliminated in the form of an anion, in particular the sulphato group or a sulphonyloxy group, in particular phenylsulphonyloxy or p-tolylsulphonyloxy, or the epoxy group

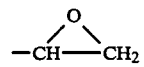

and Z, so far as it is not a direct bond, represents a divalent straight-chain or branched radical of the formula III $$-C_nH_{2n}- \qquad (III)$$

where n is a number from 1 to 4, a divalent radical of the formula IV $$-C_mH_{2m}-D-C_mH_{2m}- \qquad (IV)$$

where m denotes 1 or 2 and D represents —O—, —S—, —NH—, —CO—, —SO— or —SO$_2$—, or represents phenylene.

In bifunctional alkylating agents which are preferred for reacting with polyethyleneimine to give auxiliaries to be used according to the invention, the As are groups of the formula CH$_2$—Y which are linked with one another by way of a bridge member of the formula IV, or one of the A radicals is a group of the formula CH$_2$—Y which is bonded directly to an epoxy group.

Examples of such bifunctional alkylating agents are epichlorohydrin, glycidol, 1,3-dichloropropan-2-ol, β,β'-dichlorodiethyl ether, β,β'-dichlorodiethylamine, β,β'-dichlorodiethyl sulphide, β,β'-dichlorodiethyl sulphoxide, β,β'-dichlorodiethyl sulphone, β,β'-disulphatoethyl ether, β,β'-diphenylsulphonyloxyethyl ether, meta- or para-diepoxyethylbenzene, meta- or para-diepoxypropylbenzene, diepoxybutane, diepoxy-2-methylbutane and diepoxypropylamine.

To prepare the aftertreatment agent to be used according to the invention, the polyethyleneimine and the bifunctional alkylating agent are reacted with each other in a weight ratio of 100:0.01 to 100:2.0, preferably 100:0.1 to 100:1.0.

It is likely that in the course of this reaction crosslinking bridge members are incorporated between the polyethyleneimine chains. An external indication of the correctness of this theory is that the viscosity of the aqueous solutions markedly rises on transition from uncrosslinked polyethyleneimine to the product crosslinked by the bifunctional alkylating agent. In principle, the reaction of the polyethyleneimine with the bifunctional alkylating agents can take place in the absence of solvents. However, the reaction is more effectively controlled and heat dissipation is more favourable when the reaction is carried out in the presence of an inert solvent. Suitable solvents for this purpose are not only organic solvents in which the reactants are soluble, such as for example lower alcohols, but also, in particular, water. The reaction can be carried out within the temperature range from −10° to about 100° C. It is particularly advantageous to carry out the reaction at around standard room temperature, i.e. within the range between 15° and 45° C. As a result the course of the reaction is effectively controlled and produces an excellent product effectively with very low consumption of energy. If carried out in this way the reaction is essentially complete in the course of about 1 to 2 hours.

To obtain auxiliaries which are to be used according to the invention and which have specifications within particularly tight tolerances, i.e. to obtain especially good reproducibility of the method of preparation, it is advantageous to stir the reaction mixture at elevated temperatures, advantageously between 60° and 100° C., and at controlled pH 9–10 for several hours, generally 2 to 6 hours, after the end of the main reaction.

The use of the aftertreatment agents thus prepared leads to a very considerable improvement in the wetfastness properties of reactive dyeings and also to a considerable saving in wash operations. The fastness-improving effects are even obtained at relatively low levels of the added auxiliaries according to the invention and are far superior to the results which can be obtained with the most comparable existing auxiliaries. For instance, reactive dyeings aftertreated with products according to the invention are distinctly to considerably better than, for example, reactive dyeings aftertreated with the alkoxydiethylpolyamines disclosed by German Offenlegungsschrift No. 2,843,645.

The examples below illustrate how the aftertreatment agents to be used according to the invention are prepared and how they are used.

EXAMPLE 1

332 ml of tap water and 220 g (5.1 moles) of polyethyleneimine having an average molecular weight of 3,000–5,000, in the form of a 50% strength aqueous solution, are introduced at 20°–30° C. into a 1-liter four-necked flask, and are crosslinked at said temperature by adding 0.11 g of epichlorohydrin. After 40 minutes the solution is brought to pH 9.5 by adding concentrated H$_2$SO$_4$ and is heated at 90° C. for 4 hours. The solution is then adjusted to a concentration of 24% by adding water.

K values (measured in 1% strength aqueous solution): polyethyleneimine (starting material): $39 \times 10^3$ product: $50 \times 10^3$.

The examples of the following table can be prepared analogously.

TABLE 1

| Polyamine Component A | No. of moles (A) | Crosslinking Component (B) | No. of moles (B) | Molar ratio A:B | K 1% aqueous solution | Weight ratio A:B |
|---|---|---|---|---|---|---|
| Polyethyleneimine | 5,1 | CH$_2$—CH—CH$_2$Cl (epoxide) | 0.015 | 340:1 | $50 \times 10^3$ | 100:0.63 |
| Polyethyleneimine | 5,1 | ClCH$_2$—CH(OH)—CH$_2$Cl | 0.008 | 63.75:1 | $60 \times 10^3$ | 100:0.47 |
| Polyethyleneimine | 10,0 | ClCH$_2$—CH$_2$SO—CH$_2$—CH$_2$Cl | 0.03 | 333:1 | $64 \times 10^3$ | 100:0.07 |
| Polyethyleneimine | 8,0 | Cl—CH$_2$—CH$_2$SO$_2$—CH$_2$—CH$_2$Cl | 0.004 | 2000:1 | $70 \times 10^3$ | 100:0.18 |
| Polyethyleneimine | 5,0 | Na$^\oplus$O$_3$SO—CH$_2$—CH$_2$—O—CH$_2$—CH$_2$—OSO$_3^\ominus$Na$^\oplus$ | 0.001 | 5000:1 | $54 \times 10^3$ | 100:0.14 |
| Polyethyleneimine | 6,0 | CH$_2$—CH—CH$_2$—NH—CH$_2$—CH—CH$_2$ (bis-epoxide) | 0.025 | 240:1 | $63 \times 10^3$ | 100:1.25 |

TABLE 1-continued

| Polyamine Component A | No. of moles (A) | Crosslinking Component (B) | No. of moles (B) | Molar ratio A:B | K 1% aqueous solution | Weight ratio A:B |
|---|---|---|---|---|---|---|
| Polyethyleneimine | 4,0 |  ClCH₂—⌬—CH₂Cl | 0.01 | 400:1 | 72 × 10³ | 100:1.01 |
| Polyethyleneimine | 7,0 |  CH₂—CH—CH₂—⌬—CH₂—CH—CH₂ (with epoxide O's) | 0.02 | 350:1 | 55 × 10³ | 100:1.25 |
| Polyethyleneimine | 5,1 | 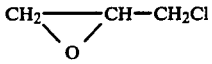 CH₂—CH—CH₂Cl (epoxide O) | 0.023 | 221.73 | 60 × 10³ | 100:1.004 |

TABLE 2

| Polyamine Component A | No. of moles (A) | Crosslinking Component (B) | No. of moles (B) | Molar ratio A:B | K 1% aqueous solution | Weight ratio A:B |
|---|---|---|---|---|---|---|
| Polyethyleneimine | 4 | CH₂—CH—CH₂OH (epoxide O) | 0.04 | 100:1 | 70 × 10³ | 100:1.72 |
| Polyethyleneimine | 20 | CH₂—CH—CH₂Cl (epoxide O) | 0.025 | 800:1 | 75 × 10³ | 100:0.26 |
| Polyethyleneimine | 50 | 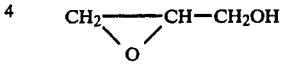 Cl—CH₂—⌬—CH₂Cl | 0.012 | 620:1 | 54 × 10³ | 100:0.098 |
| Polyethyleneimine | 80 | Cl—CH₂—CH₂—SO₂—CH₂—CH₂Cl | 0.009 | 8888:1 | 42 × 10³ | 100:0.04 |
| Branched polyethyleneimine Prim./sec./tert. 1:2:1 | 75 | ClCH₂—CH(OH)—CH₂Cl | 0.0025 | 30000:1 | 68 × 10³ | 100:0.01 |

USE EXAMPLE 1

A scoured cotton jersey fabric is dyed in a liquor which contains 3% ®Remazol Dark Blue HR, 3% ®Remazol Black B, 1 g/l ®Calgon T, 50 g/l sodium sulphate decahydrate and 20 g/l calcined sodium carbonate at 60° C. for 1 hour. The sample is then neutralised with acetic acid in the cold and is rinsed with hot water for 10 minutes. A boil soap is followed by a 20-minute treatment at room temperature in a solution which contains 5% of the product of Example 1, calculated on dry weight of fibre. The fabric is then rinsed cold.

The fastness results (staining of adjacent cotton fabric) are as follows:

|  | soaped dyeing | 5% product example | 5% ®Solidogen *FFL |
|---|---|---|---|
| heavy-duty water | 4 | 5 | 5 |
| alkaline + acid perspiration | 4–5 | 5 | 4–5 |
| 60° C. wash | 3 | 4 | 3–4 |
| 60° C. Persil wash | 2–3 | 3–4 | 3 |
| 95° C. wash | 2 | 3 | 2–3 |
| rub fastness |  |  |  |
| dry | 3 | 4 | 4 |
| wet | 3 | 3 | 2–3 |

*Commercially available after treatment agent for improving the fastness of substantive and reactive dyeings.

USE EXAMPLE 2

Scoured and bleached cotton yarn is dyed in a liquor which contains 2% ®Levafix Scarlet E-2GA, 2% ®Levafix Brilliant Red E-BA, 1 g/l ®Calgon T and 25 g/l sodium sulphate decahydrate at 40° C. for 10 minutes, and a further 25 g/l sodium sulphate decahydrate are added, followed after a further 30 minutes by 20 g/l sodium carbonate. The dyeing is complete after a further hour.

The fabric is then neutralised as customary in the cold with acetic acid, is rinsed, and is treated at pH 6 for 20 minutes with 5% of the product (on dry weight of fibre) of Example 1.

The result is a dyeing having improved fastness properties. The fastness levels as measured by the stain on adjacent cotton fabric are as follows:

| | unsoaped dyeing | 5% product example | 5% ®Solidogen FFL |
|---|---|---|---|
| heavy-duty water | 2–3 | 3–4 | 2–3 |
| alkaline perspiration | 2 | 3 | 2 |
| acid perspiration | 2 | 4 | 2 |
| 60° C. wash | 3 | 3–4 | 3 |
| 95° C. wash | 2–3 | 4 | 3 |

In this case too the product of Example 1 behaves significantly better than the commercially available aftertreatment agent Solidogen FFL.

Similar fastness improvements are obtained by using the agent according to the invention to treat reactive dyeings prepared by other methods, for example pad-steam or cold pad-batch.

The products of Table 1 can also be used for improving the fastness of reactive dyeings in analogous manner.

What is claimed is:

1. In the process for dyeing textile materials, yarns, threads or fibers dyeable with reactive dyestuffs by contact and treatment with reactive dyestuff, the improvement comprises improving the fastness of the dyed substrate by aftertreating the dyed substrate with 0.5 to 5% by weight of substrate of an aftertreatment agent which is the reaction product of polyethyleneimine and an alkylating agent having two alkylating groups in an aqueous solution.

2. The process according to claim 1 wherein the dyed substrate is aftertreated with 1 to 3% by weight of substrate of said aftertreatment agent.

3. The process according to claim 1 wherein the aftertreatment agent is the reaction product of polyethyleneimine of the formula

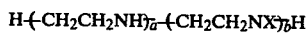

with an alkylating agent of the formula

Y—CH$_2$—Z—CH$_2$—Y wherein X is

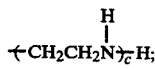

a and b independently are each a number from 0 to 600 and the sum of a and b is 50 to 600;

c is a number from 0 to 50;

Z is a direct bond, —C$_n$H$_{2n}$—, or —C$_m$H$_{2m}$—D—C$_m$H$_{2m}$—, wherein n is a number from 1 to 4, m is either 1 or 2 and D is —O—, —S—, —NH—, —CO—, —SO—, —SO$_2$— or phenylene; and Y is a substituent which can be eliminated as an anion and comprises chloro, bromo, iodo, hydroxyl, sulphato, sulphonyloxy, phenylsulphonyloxy, tolylsulphonyloxy or

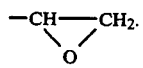

4. The process according to claim 1 wherein said bifunctional alkylating agent is epichlorohydrin, glycidol, 1,3-dichloropropan-2-ol, β,β'-dichlorodiethyl ether, ββ'-dichlorodiethylamine, β,β'-dichlorodiethyl sulphide, β,β'-dichlorodiethyl sulphoxide, β,β'-dichlorodiethyl sulphone, β,β'-disulphatoethylether, β,β'-diphenylsulphonyloxyethyl ether, meta- or para-diepoxyethylbenzene, meta- or para-diepoxypropylbenzene, diepoxybutane, diepoxy-2-methylbutane or diepoxypropylamine.

5. The process according to claim 1 wherein the aftertreatment agent is the reaction product of polyethyleneimine with epichlorohydrin, 1,3-dichloropropane-2-ol or a mixture thereof.

6. The process according to claim 1 wherein the aftertreatment agent is the reaction product of polyethyleneimine with a bifunctional alkylating agent in a weight ratio of 100:0.01 to 100:2.

7. The process according to claim 6 wherein the aftertreatment agent is the reaction product of polyethyleneimine with a bifunctional alkylating agent in a weight ratio of 100:0.1 to 100:1.

8. The process according to claim 1 wherein the aftertreatment temperature is about 40°° to 100° C.

9. The process according to claim 1 wherein the aftertreatment is at about 60° to 100° C. at a pH of about 9–10 for a period of about 2 to 6 hours.

10. A dyed substrate of textile material, yarns, threads or fibers having an improved fastness prepared by the process according to claim 1.

* * * * *